United States Patent
Wang et al.

(10) Patent No.: US 9,786,418 B2
(45) Date of Patent: Oct. 10, 2017

(54) CABLE SPLITTER AND VIDEO DEVICE USING SAME

(71) Applicants: NANNING FUGUI PRECISION INDUSTRIAL CO., LTD., Nanning (CN); HON HAI PRECISION INDUSTRY CO., LTD., New Taipei (TW)

(72) Inventors: Ming-Tao Wang, Shenzhen (CN); Hua-Qi Wang, Shenzhen (CN)

(73) Assignees: NANNING FUGUI PRECISION INDUSTRIAL CO., LTD., Nanning (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/142,278

(22) Filed: Apr. 29, 2016

(65) Prior Publication Data
US 2017/0207007 A1 Jul. 20, 2017

(30) Foreign Application Priority Data
Jan. 18, 2016 (CN) .......................... 2016 1 0028594

(51) Int. Cl.
H01B 7/00 (2006.01)
H01B 17/12 (2006.01)
H04N 5/225 (2006.01)
H01B 7/08 (2006.01)

(52) U.S. Cl.
CPC ........... *H01B 17/12* (2013.01); *H04N 5/2254* (2013.01); *H01B 7/08* (2013.01)

(58) Field of Classification Search
CPC ........ H01B 17/12; H01B 7/08; H04N 5/2254; B60R 16/0215; G02B 6/4477; H01R 13/5812; H01R 13/5841; H01R 13/6275; H02G 3/04; H02G 3/32; H02G 11/00; H02G 15/007; Y10T 24/3916
USPC ........................ 174/71 R, 545; 439/422, 460
See application file for complete search history.

(56) References Cited

U.S. PATENT DOCUMENTS

| 6,908,140 B1* | 6/2005 | Carter ................. B60R 16/0215 296/146.1 |
| 2007/0084624 A1* | 4/2007 | Martin ..................... H02G 3/04 174/135 |
| 2007/0087620 A1* | 4/2007 | Yamamoto .......... B60R 16/0215 439/422 |
| 2010/0128122 A1* | 5/2010 | Wright ................... G03B 17/00 348/143 |

(Continued)

FOREIGN PATENT DOCUMENTS

| CN | 2874822 Y | 2/2007 |
| CN | 103250315 A | 8/2013 |
| CN | 204407535 U | 6/2015 |

(Continued)

*Primary Examiner* — Timothy Thompson
*Assistant Examiner* — Guillermo Egoavil
(74) *Attorney, Agent, or Firm* — Steven Reiss

(57) ABSTRACT

A cable splitter includes a main body. The main body includes a top wall and an end portion. The top wall defines a splitting slot, a first guide slot, a second guide slot running through the top wall. The end portion includes a first guide arm and a second guide arm extending from the end portion and corresponding to the first guide slot and the second guide slot.

9 Claims, 7 Drawing Sheets

(56) References Cited

U.S. PATENT DOCUMENTS

2013/0243386 A1* 9/2013 Pimentel .............. G02B 6/4441
                                                     385/135
2017/0023156 A1* 1/2017 Hoffman ................ E04F 19/04

FOREIGN PATENT DOCUMENTS

CN    204481598 U    7/2015
TW    M468125    12/2013

* cited by examiner

CABLE SPLITTER AND VIDEO DEVICE USING SAME

FIELD

The disclosure generally relates to cable splitters, and particularly to a cable splitter capable of preventing cables from loosening and twisting and an video device using the cable splitter.

BACKGROUND

Cable splitters are widely used in electronic device for branching a cable group. However, outlets of the cable splitters commonly do not have a fixing function so that the cables may be easily twisted or loosen during use.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
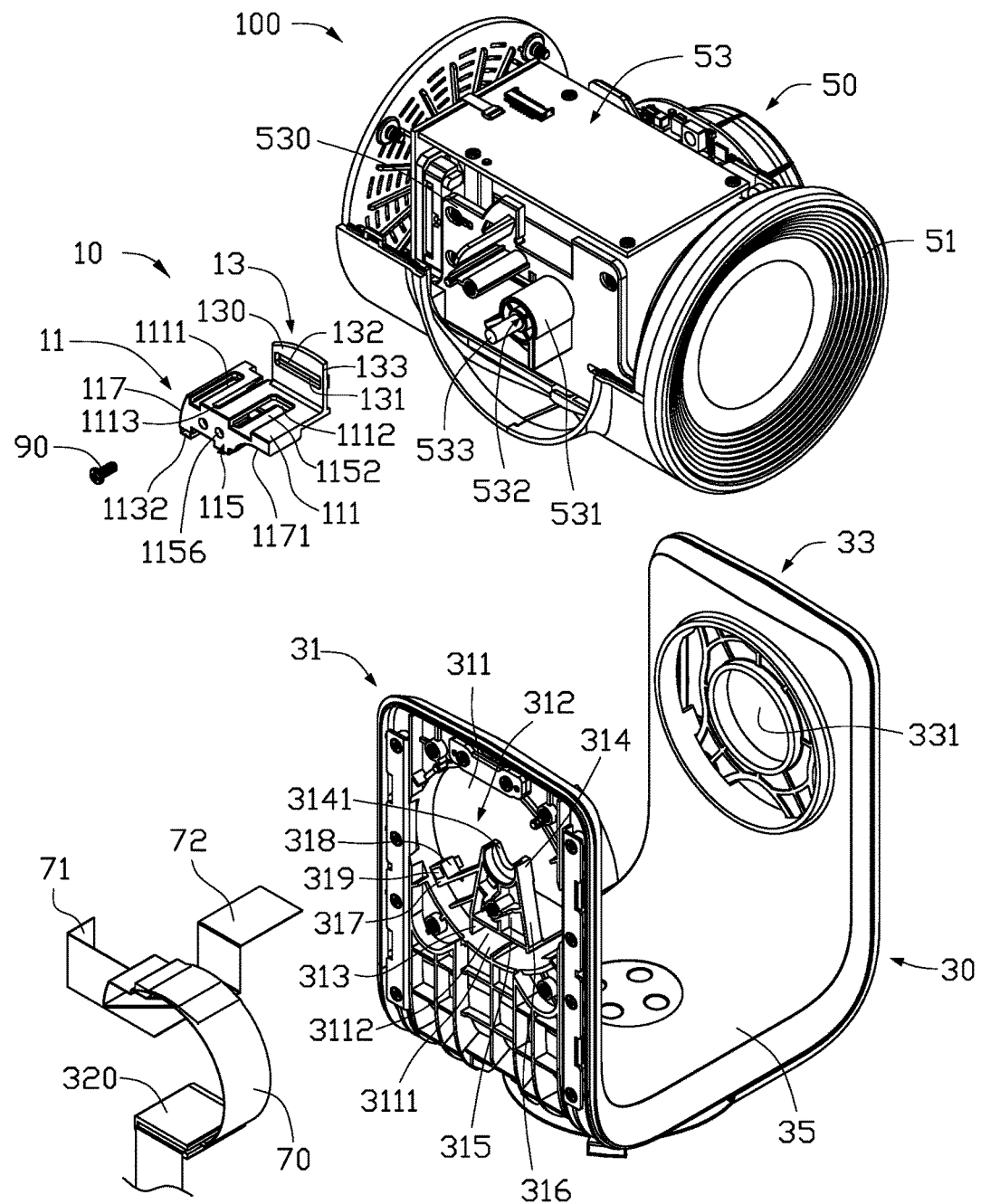
FIG. 1 is a disassembled, isometric view of an video device, according to an exemplary embodiment.

It will be appreciated that for simplicity and clarity of illustration, where appropriate, reference numerals have been repeated among the different figures to indicate corresponding or analogous elements. In addition, numerous specific details are set fourth in order to provide a thorough understanding of the embodiments described herein. However, it will be understood by those of ordinary skill in the art that the embodiment described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Figure 2:
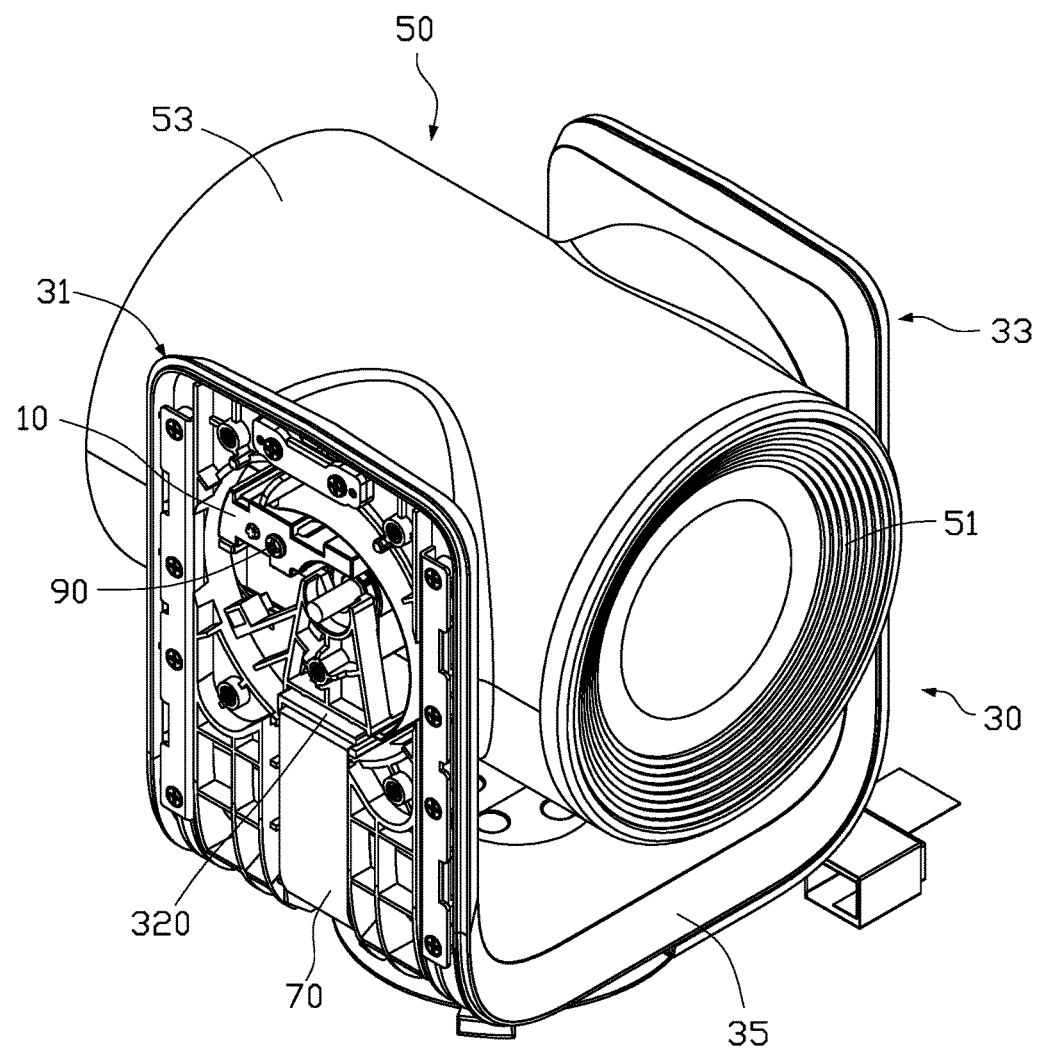
FIG. 2 is an assembled, isometric view of the video device of FIG. 1.

FIG. 1 is a disassembled, isometric view of an video device 100, according to an exemplary embodiment. The video device 100 includes a cable splitter 10, a support 30, and a lens assembly 50. FIG. 2 illustrates that the cable splitter 10 is secured to the lens assembly 50. The lens assembly 50 is rotatably assembled to the support 30.

Figure 3:
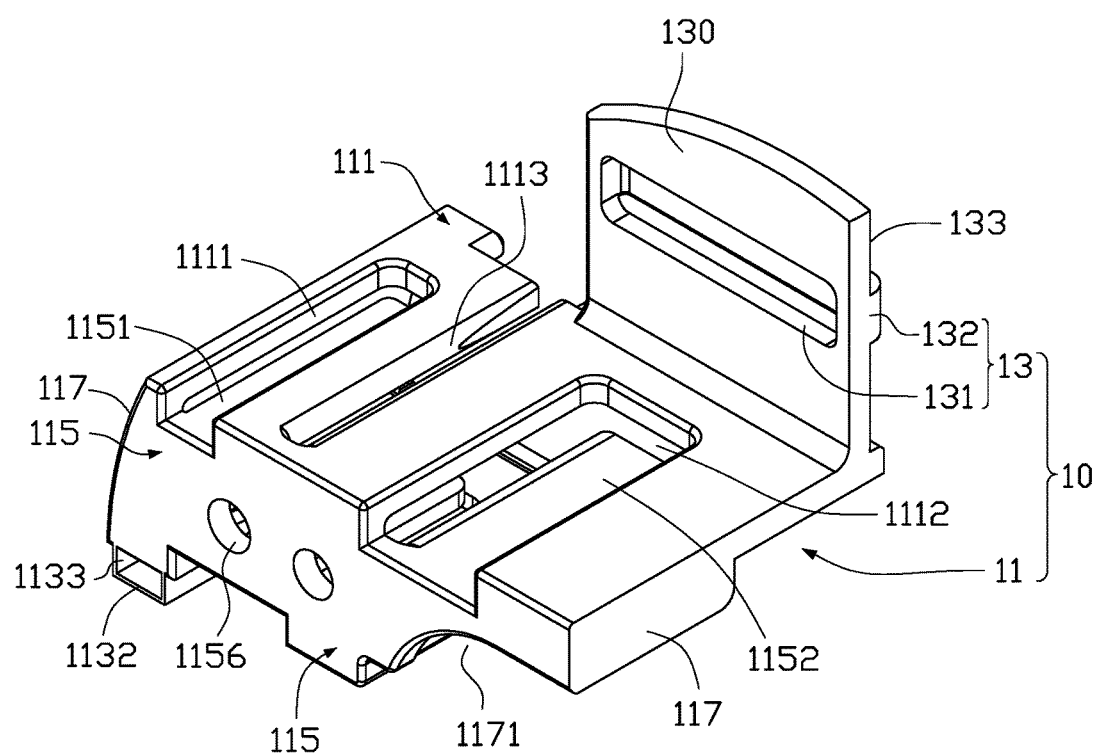
FIG. 3 is an isometric view of a cable splitter the video device of FIG. 1.
Figure 4:
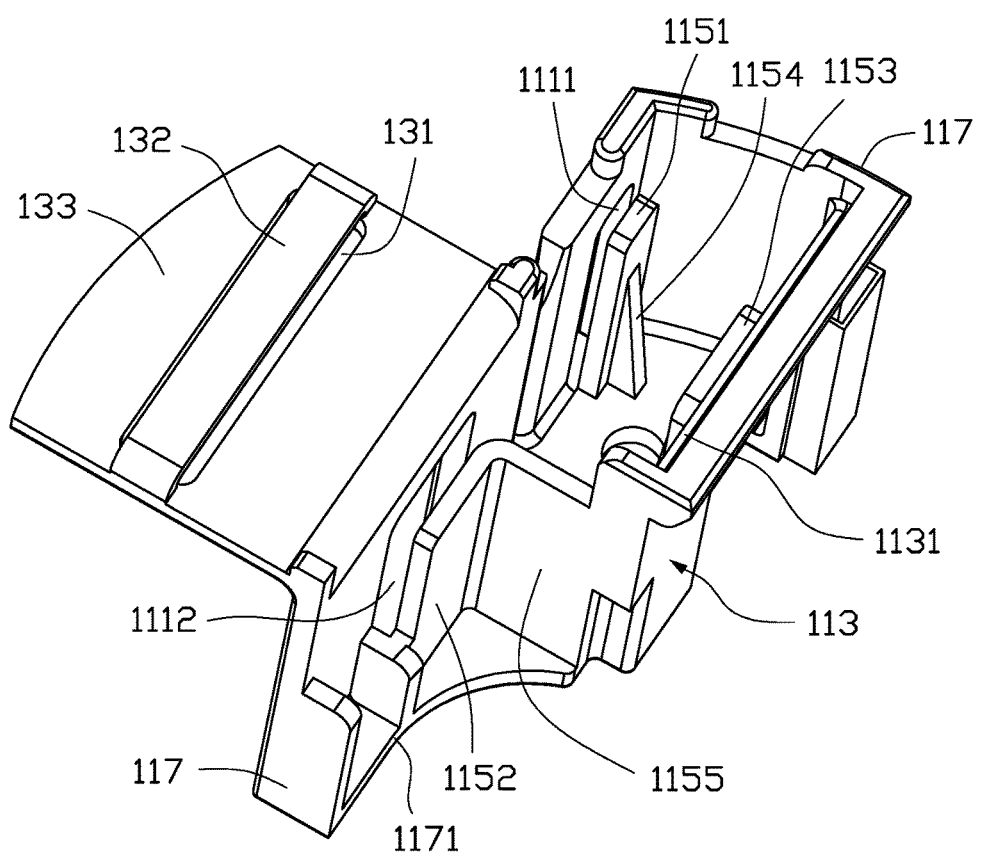
FIG. 4 is similar to FIG. 3, but shown from another aspect.

FIGS. 3 and 4 illustrate that the cable splitter 10 includes a main body 11 and an extension plate 13. The main body 11 is substantially a hollow block including a top wall 111, a bottom wall 113, an end portion 115, and a side wall 117. The bottom wall 113 is substantially parallel to the top wall 111. The end portion 115 is substantially perpendicularly connected to the top wall 111 and the bottom wall 113. The side wall 117 is substantially perpendicularly connected to the top wall 111, the bottom wall 113, and the end portion 115. The extension plate 13 substantially perpendicularly extends from a side of the top wall 111. A cable group 70 (shown in FIG. 5) such as flexible flat cable can extend through the main body 11 and the extension plate 13 to branch as a first cable 71 (shown in FIG. 5) and a second cable 72 (shown in FIG. 5).

A first guide slot 1111 and a second guide slot 1112 are defined in the top wall 111. The first and second guide slots 1111, 1112 are parallel to each other and running through the top wall 111 and the end portion 115. A splitting slot 1113 is defined in the top wall 111 running through the top wall 111. The splitting slot 1113 is positioned between the first guide slot 1111 and the second guide slot 1112, and parallel to the first guide slot 1111 and the second guide slot 1112. A third guide slot 1131 is defined in a side of the bottom wall 11 opposite to the end portion 115. The third guide slot 1131 runs through the bottom wall 113 and is perpendicular to the first guide slot 1111 and the second guide slot 1112.

A first guide arm 1151 and a second guide arm 1152 extend from the end portion 115 parallel to the top wall 111. A third guide arm 1153 extends from the bottom wall 113. The first guide arm 1151, the second guide arm 1152, and the third guide arm 1153 are parallel to each other. The first guide arm 1151 corresponds to the first guide slot 1111 and serves as a bottom of the first guide slot 1111. The first guide arm 1151 is fixed to the top portion 111 and the end portion 115 by a rib 1154. The second guide arm 1152 corresponds to the second guide slot 1112 and serves as a bottom of the second guide slot 1112. The second guide arm 1152 is connected to the bottom wall 113 by a connecting plate 1155. The third guide arm 1153 is parallel to the first guide arm 1151 and extends toward the third guide slot 1131 and spaced from the third guide slot 1131.

A plurality of positioning holes 1156 are defined in a middle portion of the end portion 115. In this exemplary embodiment, there are two collinear positioning holes 1156. A first receiving chamber 1132 is formed on the bottom wall 113 adjacent to the side wall 117. The receiving chamber 1132 is substantially a hollow frame having two openings at two ends thereof. A first magnetic body 1133 is received in the first receiving chamber 1132. The first magnetic body 1133 can be a permanent magnet or electromagnet. In this exemplary embodiment, the first magnetic body 1133 is a permanent magnet. A first cut 1171 is defined in the end portion 115. The first cut 1171 is substantially arcuate.

The extension plate 13 includes a first surface 130 and a second surface 133. A fourth guide slot 131 is defined in the extension plate 13 running through the first surface 130 and the second surface 133. A fourth guide arm 132 is extending from the second surface 133, corresponding to the fourth guide slot 131 and serving as a bottom of the fourth guide slot 131.

Figure 5:
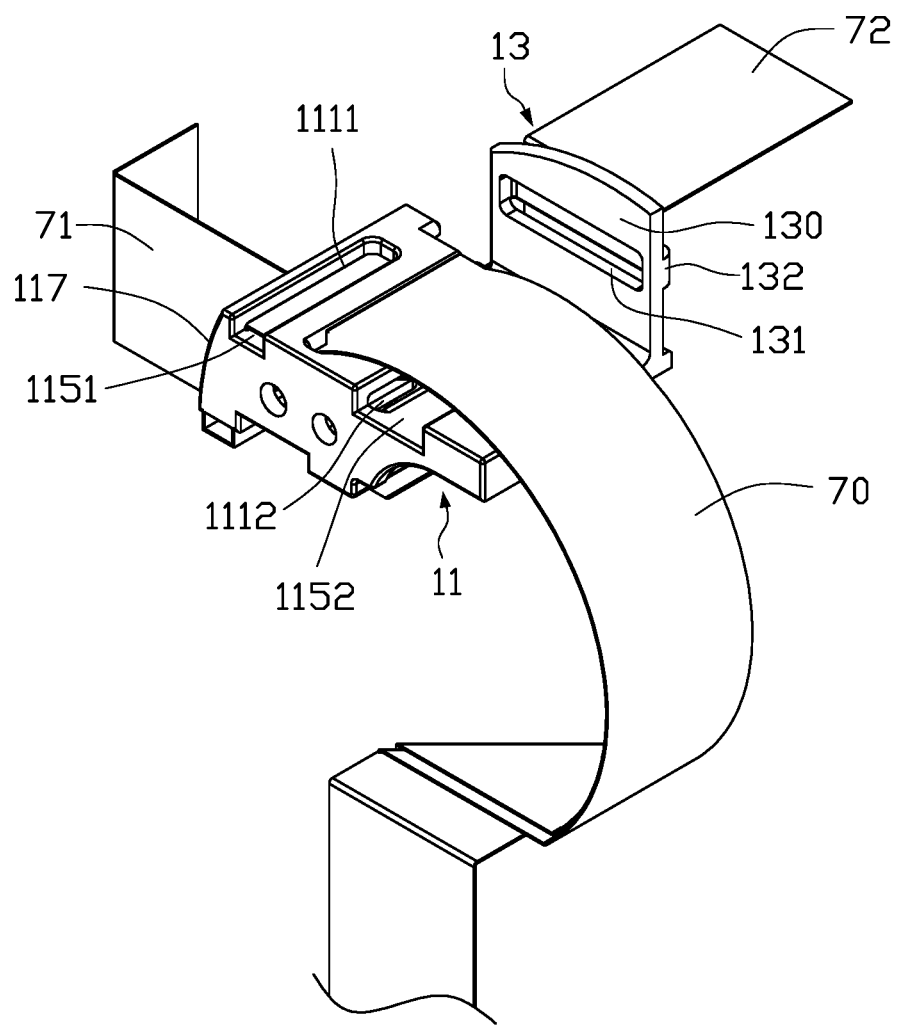
FIG. 5 is an isometric view of the cable splitter of FIG. 1 with a cable group.
Figure 6:
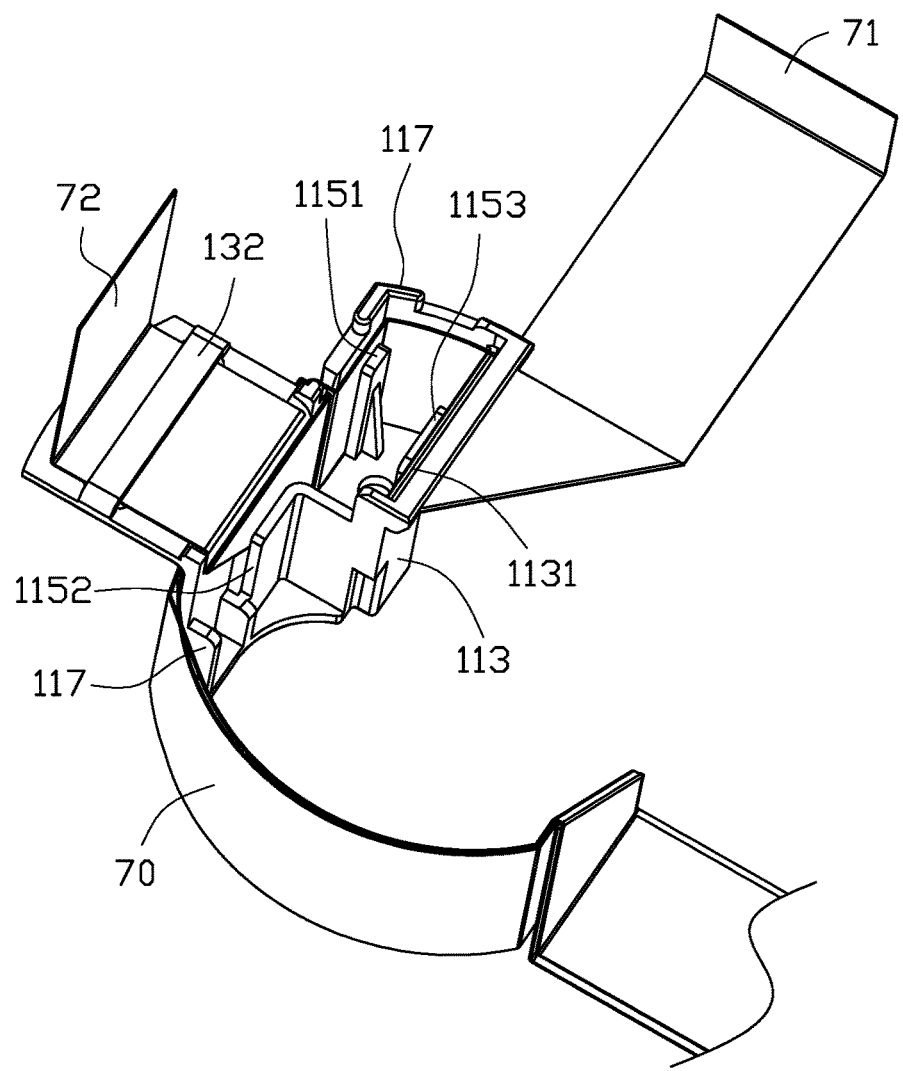
FIG. 6 is similar to FIG. 5, but shown from another aspect.

FIGS. 5 and 6 illustrate that, to branching the cable group 70, the cable group 70 is inserted into the splitting slot 1113. The first cable 71 extends through the first guide slot 1111 and partially coils around the first guide arm 1151, moves along the side wall 117, and then extends through the third guide slot 1131. The second cable 72 extends through the second guide slot 1112 and partially coils around the second guide arm 1152, moves toward the second surface 133, and then extends through the fourth guide slot 131 and partially coils around the fourth guide arm 132. Thus, the cable group 70 can be branched by the cable splitter 10. In addition, the cable group 70 can be secured by the first guide arm 1151, the second guide arm 1152, the third guide arm 1153, and the fourth guide arm 132 so that the cable group 70 cannot be easily twisted or loosen.

The support 30 includes a first extension portion 31, a second extension portion 33, and a fixing portion 35. The first extension portion 31 and the second extension portion 33 respectively extend from two opposite ends of the fixing portion 35 and form a U-shaped structure. A first through hole 311 is defined in the first extension portion 31. A second through hole 331 is correspondingly defined in the second extension portion 33.

A holder 312 is formed on an inner surface 3111 of the first through hole 311. The holder 312 includes a bottom portion 313, a top portion 314, and a middle portion 315. The bottom portion 313 is connected to the inner surface 3111. A space 3112 is formed between the middle portion 315 and the inner surface 3111. The space 3112 is an entrance for the cable group 70 entering into the video device 100.

The top portion 314 is substantially an arcuate recess. A substantially arc-shaped second cut 3141 is defined in the top portion 314. The top portion 314 is connected to the bottom portion 313 through the middle portion 315.

The middle portion 315 includes two supporting plates 316. A first end of each supporting plate 316 is connected to the top portion 315, and a second end of each supporting plate 316 is aligned with the bottom portion 313. A resisting plate 317 is positioned between the inner surface 3111 and one of the supporting plate 316.

A second receiving chamber 318 is formed at the junction of the inner surface 3111 and the supporting plate 316. The second receiving chamber 318 is substantially a hollow frame having two openings. Two surfaces of the second receiving chamber 318 are respectively secured to the inner surface 3111 and the resisting plate 317. A second magnetic body 319 is received in the second receiving chamber 318. The second magnetic body 319 can be a permanent magnet or electromagnet. In this exemplary embodiment, the second magnetic body 319 is a permanent magnet. Two opposite sides of the second magnetic body 319 and the first magnetic body 1133 face each other and have a same polarity facing each other.

Figure 7:
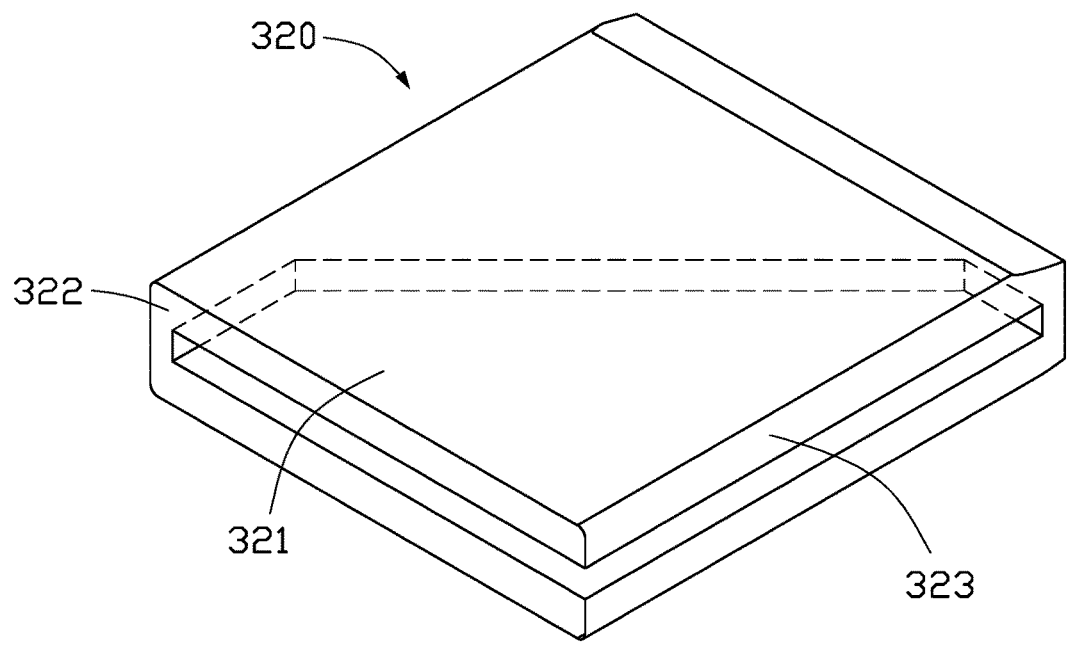
FIG. 7 is an assembled, isometric view of a washer, according to an exemplary embodiment.

FIG. 7 illustrates that the support 30 further includes a washer 320. The washer 320 is substantially rectangular and corresponding to the bottom portion 313. The washer 320 can be made of elastic material such as rubber. The cable group 70 is secured into the washer 320. A receiving slot 321 is defined in the washer 320 running through a first end 322 and a second end 323. A cross-section of the receiving slot 321 is substantially trapezoidal. The cable group 70 is inserted into the washer 320 from the first end 322, and then out from second end 323 after being bent. A bent portion of the cable group 70 is substantially an angled turn and positioned in the receiving slot 321. The washer 320 and the cable group 70 can be latched into the space 3112 together. The bent portion of the cable group 70 can be secured in the receiving slot 321 by using of interference fit between the bottom portion 313 and the washer 320 so the cable group 70 cannot be easily loosen.

The lens assembly 50 includes a lens 51 and a connecting member 53. The lens 51 is secured on the connecting member 53. A substantially cylindrical protrusion 531 protrudes from a middle portion of an end 530 of the connecting member 53. A shaft hole 532 is defined in the protrusion 531. A securing shaft 532 protrudes from the protrusion 531 and extends through the shaft hole 532. A screw hole (not labeled) is defined in the end 530 for attaching the cable splitter 10 to the lens assembly 50.

In assembly, the cable splitter 10 is received in the first hole 311 with the cable group 70. The lens assembly 50 is assembled to the support 30. The protrusion 531 is latched into the first cut 1171. A screw 90 extends through the positioning hole 1156 and is screwed into the screw hole so that the cable splitter 10 is secured to the connecting member 53. The connecting member 53 is positioned between the first extension portion 31 and the second extension portion 33. The securing shaft 532 is received in the second cut 3141 so that the lens assembly 50 can rotate relative to the support 30.

To anticlockwise rotate the lens assembly 50, the cable group 70 is gradually tightened, with the increase of a rotation angle of the lens assembly 50, rotational resistance torque of the lens assembly 50 is increased, and a distance between the first magnetic body 1133 and the second magnetic body 319 is decreased. Because the first magnetic body 1133 and the second magnetic body 319 have the same polarity, repulsive force therebetween also increases which can counteract a portion or all of the rotational resistance torque. As such, the cable group 70 can be avoided from breaking.

To clockwise rotate the lens assembly 50, the cable group 70 is gradually loosened, with the increase of the rotation angle of the lens assembly 50, the rotational resistance torque also decreases, and the distance between the first magnetic body 1133 and the second magnetic body 319 also decreases, the repulsive force therebetween also decreases. In this exemplary embodiment, the rotation angle of the lens assembly 50 is about 15 degrees.

The cable splitter 10 branches and secures the cable group 70 by the first, second, third, and forth guide slots 1111, 1112, 1131, and 131 and their corresponding the first, second, third, and forth guide arms 1152, 1152, 1153, and 132 which can prevent the cable group 70 from loosing during the rotation of the lens assembly 50. In addition, the cable splitter 10 uses the washer 320 to secure the cable group 70 to the support 30 to prevent the cable group 70 from being twisted or breaking. Furthermore, the first and second magnetic bodies 1133, 319 generates the repulsive force to balance the rotational resistance torque during rotating the lens assembly 50 so that the lens assembly 50 can be easily rotated.

It is to be understood, however, that even through numerous characteristics and advantages of the present disclosure have been set fourth in the foregoing description, together with details of assembly and function, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. A cable splitter comprising:
 a main body, the main body comprising
  a top wall, the top wall defining a splitting slot, a first guide slot, a second guide slot running through the top wall, an extension plate extending from a side of the top wall, wherein the extension plate comprises a first surface, the first surface defines a fourth guide slot; and
 an end portion, the end portion comprising a first guide arm and a second guide arm respectively extending from the end portion and corresponding to the first guide slot and the second guide slot.

2. The cable splitter of claim 1, wherein the splitting slot is positioned between the first guide slot and the second guide slot, the splitting slot, the first guide slot and the second guide slot are parallel to each other.

3. The cable splitter of claim 1, wherein the main body further comprises a bottom wall, the bottom wall defines a third guide slot extension therethrough and perpendicular to the first guide slot.

4. The cable splitter of claim 3, wherein the end portion further comprises a third guide arm extension therefrom, the third guide arm is parallel to the first guide arm and extension toward the third guide slot.

5. The cable splitter of claim 1, wherein the, fourth guide slot running through the extension plate and perpendicular to the first guide slot.

6. The cable splitter of claim 5, wherein the extension plate further comprises a second surface, the second surface comprises a fourth guide arm corresponding to the fourth guide slot and serving as a bottom of the fourth guide slot.

7. The cable splitter of claim 1, wherein the main body further comprises a bottom wall and a first receiving chamber formed in the bottom wall, the first receiving chamber comprises a first magnetic body received therein.

8. A cable splitter comprising:
a main body comprising:
   a top wall, the top wall defining a splitting slot, a first guide slot, a second guide slot running through the top wall, wherein the splitting slot is positioned between the first guide slot and the second guide slot, the splitting slot, the first guide slot and the second guide slot are parallel to each other; and
   an end portion, the end portion comprising a first guide arm and a second guide arm respectively extending from the end portion and corresponding to the first guide slot and the second guide slot.

9. A cable splitter comprising:
a main body comprising:
   a top wall, the top wall defining a splitting slot, a first guide slot, a second guide slot running through the top wall; and
   a bottom wall, the bottom wall defines a third guide slot extension the rethrough and perpendicular to the first guide slot; and
   an end portion, the end portion comprising a first guide arm and a second guide arm respectively extending from the end portion and corresponding to the first guide slot and the second guide slot.

* * * * *